H. WYMAN.
Loom.

No. 197,754. Patented Dec. 4, 1877.

Witnesses.
E. C. Perkins.
W. J. Pratt.

Inventor.
Horace Wyman
by Crosby & Gregory
Attys

H. WYMAN.
Loom.

No. 197,754. Patented Dec. 4, 1877.

Witnesses.
E. C. Perkins.
W. J. Pratt.

Inventor.
Horace Wyman
by Crosby & Gregory
Attys

H. WYMAN.
Loom.

No. 197,754. Patented Dec. 4, 1877.

H. WYMAN.
Loom.

No. 197,754. Patented Dec. 4, 1877.

H. WYMAN.
Loom.

No. 197,754. Patented Dec. 4, 1877.

Witnesses.
W. J. Pratt.
E. C. Perkins.

Inventor.
Horace Wyman
per Crosby & Gregory Att'ys

H. WYMAN.
Loom.

No. 197,754. Patented Dec. 4, 1877.

Witnesses.
W. J. Pratt.
E. E. Perkins.

Inventor.
Horace Wyman
per Crosby & Gregory Attys.

UNITED STATES PATENT OFFICE.

HORACE WYMAN, OF WORCESTER, MASSACHUSETTS.

IMPROVEMENT IN LOOMS.

Specification forming part of Letters Patent No. 197,754, dated December 4, 1877; application filed May 15, 1877.

*To all whom it may concern:*

Be it known that I, HORACE WYMAN, of Worcester, in the county of Worcester and State of Massachusetts, have invented an Improvement in Looms, of which the following is a specification:

This invention relates to improvements in looms; and has reference to mechanism for operating the shuttle-boxes, and to mechanism to stop the loom instantly when the filling breaks, or for any reason fails to become properly lodged in the shed, and to mechanism to suspend the movement of the shuttle-box-operating chain whenever it is desired to employ any one shuttle of the series for a number of consecutive picks.

Fig. 16, a front elevation of a part of the loom sufficient to illustrate the weft-stop motion.

Figure 11:
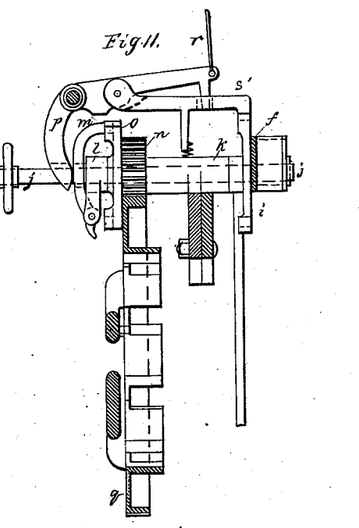
Fig. 11, a section on line A B, Fig. 9.
Figure 13:
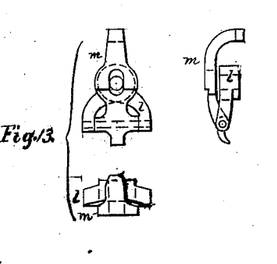
Fig. 13, an end, a side elevation, and a plan of the clutch-finger, which, when in operation is secured to a rotating shaft.
Figure 14:
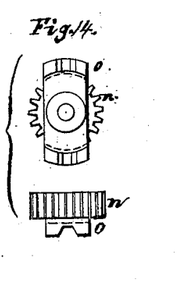
Fig. 14, an end elevation and plan of the clutch-gear to be engaged by the clutch-finger.
Figure 15:
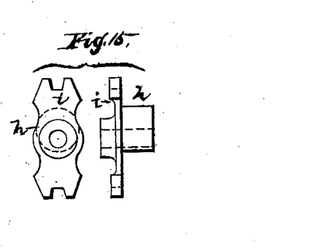
Fig. 15, an end and side elevation of the arm and eccentric-hub to serve as the fulcrum for the box-lever.

The loom-frame $a$ may be of any suitable construction to sustain the working parts. The crank-shaft $b$, lathe $c$, shuttle-boxes $d$, shuttle-box rod $e$, and stirrup are, or may be, of any usual construction. The shuttle-box lever $f$, connected by a link, $g$, with the shuttle-box rod, and so as to move at its forward end with the boxes, has its fulcrum on an eccentric-hub, $h$, (see Fig. 15,) projecting from a double arm, $i$, connected with a shaft, $j$, mounted in a bearing, $k$, and provided with an eared collar, $l$, to which is pivoted a clutch-finger, $m$, (see Figs. 11 and 13.) Placed loosely upon the shaft is a clutch-pinion, $n$, having an attached notched plate, $o$, with which the clutch-finger $m$ is made to engage at proper times by means of the lever $p$, connected by wire $r$ or otherwise with one of the fingers resting upon the pattern mechanism, as in a loom heretofore patented to me, No. 129,640, July 16, 1872, to which reference may be had.

Figure 12:
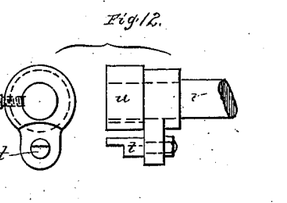
Fig. 12, an end and side view of the pin-wheel to drive the star-gear.

The pinion $n$ meshes with the teeth at the periphery of the star-wheel $q$, mounted on a stud, $s$, and rotated intermittingly by a pin, $t$, (see Fig. 12,) on a hub, $u$, of a pin-wheel attached to the rotating lower shaft $v$ of the loom. The inner portion of the star-wheel is provided with a series of notches, $w$, forming internal teeth. The entrance into each notch is cut away, as at $x$, and left to project, as at $y$, whereby the pin $t$ may easily enter the notches and quickly start up the wheel, and, by operating upon the projecting portions $y$, stop the wheel slowly, thereby turning such wheel with less jar and greater accuracy than were the notches simply radial, and at greater speed than were the notches or teeth made upon the outer portion of the wheel, as in my former patent, to which reference has been made.

The normal condition of the clutch-fingers $m$ is out of engagement with the notched part of the pinion, which is loose on its shaft, the latter being adapted to be rotated half-way around at each rotation of the shaft $v$, or at each movement of the star-wheel $q$. When the clutch-finger is disengaged, the pinion $n$ will turn and not move the shaft $j$; but if the clutch-finger engages the part $o$, through the action of the knee-lever $p$, moved by the pattern-surface, then the shaft $j$ will be rotated half around, and the eccentric $h$, the fulcrum of the box-lever, will lift or lower the lever sufficiently to move the boxes one cell.

Figure 1:
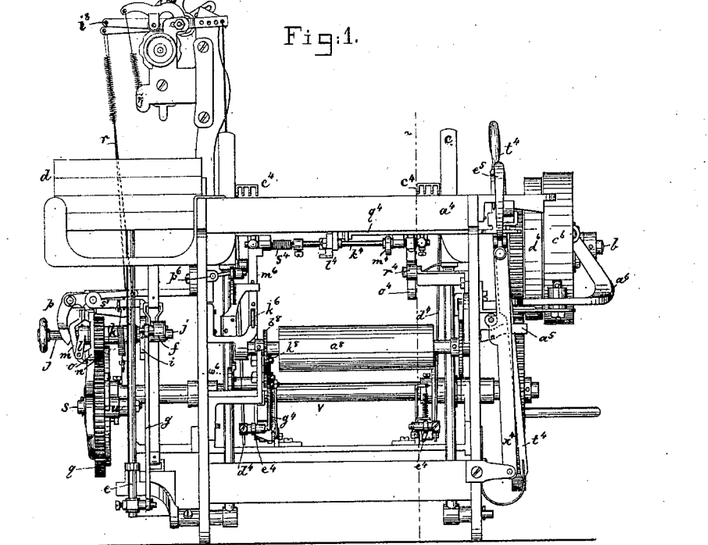
Figure 1 represents, in front view, a loom embodying my invention, the shuttle-box mechanism being placed at the left-hand end of the loom, viewing it from the front.
Figure 9:
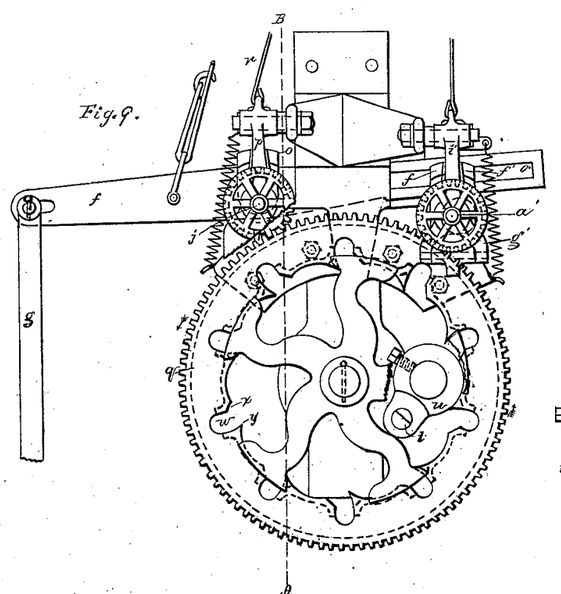
Fig. 9, an enlarged detail of the shuttle-box lever (shown in Fig. 8) and its actuating devices.
Figure 10:
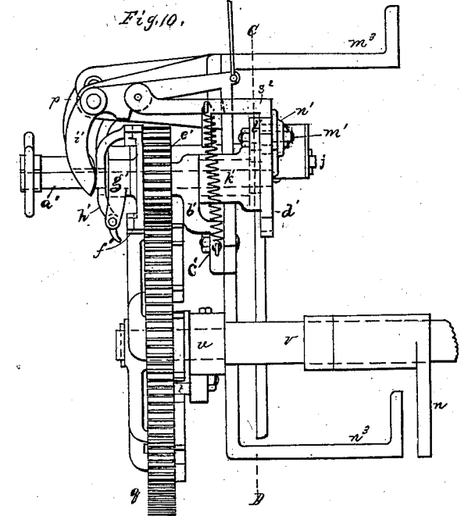
Fig. 10, a side view of Fig. 9, looking from the back of the loom.

A second shaft, $a^1$, Figs. 1, 9, and 10, supported in a bracket, $b^1$, shown attached to the loom-frame by bolts passing through holes $c^1$, has at its innermost end double arms $d^1$. Upon this shaft is a loose pinion, $e^1$, having an attached notched plate, $f^1$, thereby making it a clutch-gear, as before described; and attached to the shaft is a collar, $g^1$, having an attached clutch-finger, $h^1$, pressed into engagement with the clutch part $f^1$ at suitable times, according to the indications of the pattern, through a lever, $i^1$, connected as usual with a finger resting upon the pattern cylinder or chain.

The clutch-gear and clutch-finger, and their operative mechanism, are the same for each intermittingly-rotating shaft $j$ and $a^1$.

The crank-pin $m^1$, operated by the shaft $a^1$ and arm $d^1$, enters a slot, $o^1$, in the end of the shuttle-box lever, and moves it, as the shaft $a^1$ is turned, a semi-rotation, the crank-pin then raising and lowering the end of the lever.

The throw of the crank-pin $m^1$ is sufficient to operate the shuttle-box lever far enough to move the shuttle-boxes from any cell to the second one from it, skipping one box; and as the eccentric $h$ moves the box-lever to change the boxes from one to the next cell, as before described, it results that by the separate, or augmented, or discounted movement of the crank and eccentrics, the lever may be operated to shift from any one to any other shuttle-box of the series of four boxes—that being the number contemplated and provided for in this present embodiment of my invention.

The double arms $i$ $d^1$ are each provided at each end with a notch, into which falls a holding-latch, $s^1$ or $s^2$, pivoted to the knee-levers $p$ and $i^1$, that operate the clutch-fingers. These latches are each held down by a spring, and they retain the arms in position when not moved positively by the shafts, and serve to stop the arms at the end of each movement.

In my former patent these knee-levers $p$ and $i^1$ and latches were in one piece. By separating them I am enabled to hold the arms in position during the time that the knee-levers act to engage and disengage the clutches, during which time, under my former construction, the arms and shafts were liable to be moved prematurely, which prevented the catch from properly engaging and operating the shafts and box-lever.

In Fig. 16 the shuttle-boxes are omitted and part of the breast-beam $a^4$ is broken away to show the race-beam $b^4$ of the lathe and the weft-stop mechanism connected therewith.

Referring to Figs. 1 and 7 and 16 to 21, the weft-feeler $c^4$ consists of a series of horizontal wires or fingers, projecting forward from a rod, $d^4$, guided by the race-board of, and adapted to move with, the lay. This feeler is connected at its lower end with an arm, $e^4$, pivoted to the loom-frame at $f^4$, and held at its back end by a spring, $g^4$, so as to be moved at each semi-rotation of the shaft $v$ by a cam, $h^4$, whereby the weft-feelers at each side the lay, they being alike, are lowered and raised positively by the cam and arm alone after each passage of a shuttle to lay a thread below the feelers.

The weft-fork $i^4$ (shown detached in Fig. 21) is composed of a shaft having at one side a series of projecting fingers, and at the other side a hook, $j^4$. The fingers of the fork rest upon a bent wire, $g^4$, that acts as a spring to hold the fork balanced in a horizontal position, and to keep it from jumping under the action of the grid and thread. When the fork jumps the thread is liable to escape. A rock-shaft, $k^4$, suitably supported upon the lay at the back of the race-board, has attached to it a dagger, $l^4$, an up-stop, $m^4$, and upwardly-projecting arm, $n^4$, provided with a passage, 20, (see Fig. 20,) and a spring-arm, $o^4$.

Figures 18, 19, 20, 21, 31, 32:
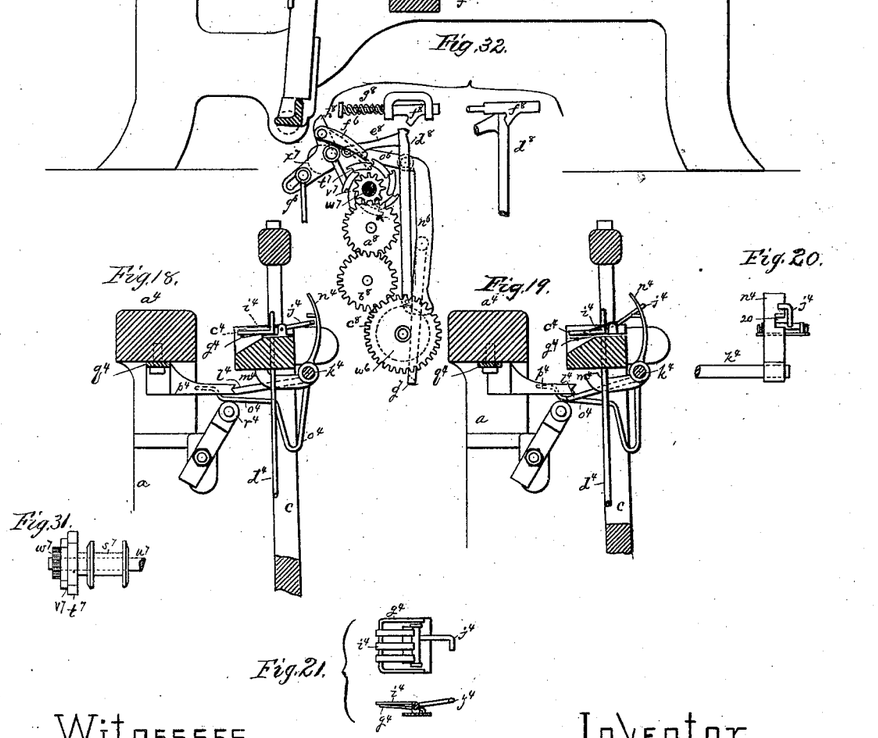
Figs. 18, 19, 20, and 21, details of the weft-stopping devices in different positions.
Figs. 31 and 32, a modified form of devices to suspend the operation of the shuttle-box-operating chain.

When the weft is present on the fork, and the feeler descends, the fingers of the fork are depressed, as in Figs. 19 and 20, and the hook $j^4$ is so placed that it catches upon the arm $n^4$. In this position the hook holds the arm and rock-shaft, so that the dagger passes below the notched block $p^4$, and the loom operates regularly.

When the weft is absent, and therefore the fork is not tipped, the grid descends below, as in Fig. 18, and the hook $j^4$ then comes in line with the passage 20 in the arm $n^4$, and as the latter moves forward, the spring-arm $o^4$, coming in contact with the roller $r^4$, rocks the shaft $k^4$ (its arm $n^4$ not being held) and lifts the dagger $l^4$, so that it meets the notched block $p^4$ attached to the stop-bar $q^4$, and operates a shipper-lever to release the friction-pulleys from driving-engagement with the crank-shaft, and also a brake-shipper to operate a brake-lever and stop the loom. The stop-bar operates both levers simultaneously, so that the brake is applied just as the friction-pulleys are disengaged, which enables the loom to be stopped before the crank-shaft moves far enough to again operate the shuttle after the action of the weft-stop. This construction prevents the possibility of a mispick.

When the weft is present and the arm $n^4$ is held by the hook $j^4$, the end of the spring $o^4$ yields to the action of the roller $r^4$, and the shaft is not rocked.

Figure 17:
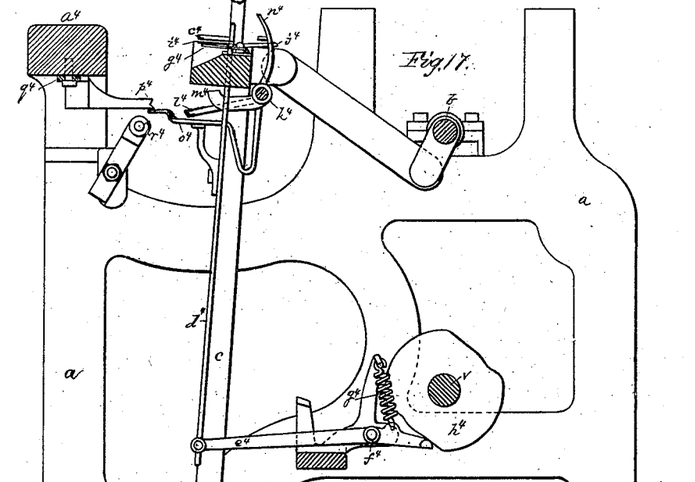
Fig. 17, a section on line $y\ y$, Fig. 16.

In Fig. 17, the grid is just in position to touch the thread, if present. This weft-stop mechanism, carried entirely by the lay and disconnected from the breast-beam, is very efficient in connection with looms having a series of shuttle-boxes wherein each thread must be kept separated when the grid descends. The tendency of the spring $s^4$ is to hold the end of the up-stop $m^4$ against the bottom of the lay.

The brake-shipper $x^4$ is provided with a roller, which operates against the cam-shaped end of a brake-lever, $a^5$, so as to force the pivoted shoe $b^5$ against the V-shaped periphery $c^5$ of a brake-wheel on the crank-shaft, so as to stop the loom instantly.

The brake-lever $a^5$ is supported on a crank-pin, $d^5$, preferably made as an eccentric, to lower or raise the fulcrum of the lever to fit the shoe to the periphery of the brake-wheel.

Figure 22:
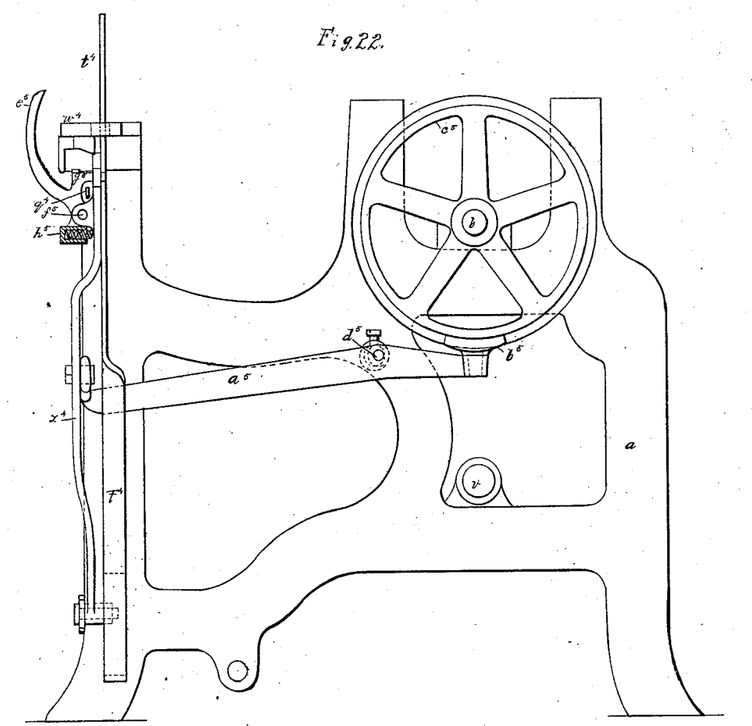
Fig. 22, a side elevation, showing the brake mechanism to stop the loom quickly, the friction-pulleys mounted on the crank-shaft being removed.
Figure 23:
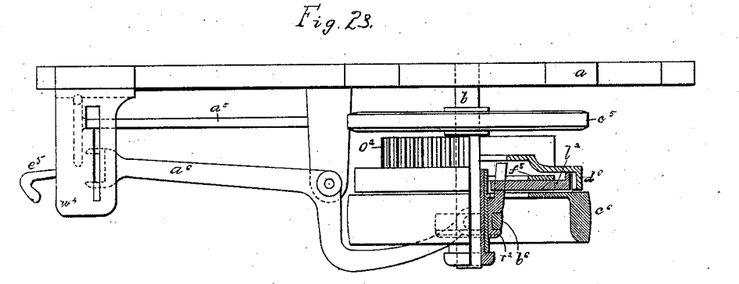
Fig. 23, a detail of the end of the loom, showing the brake-wheel and the friction-pulley partially in section.

A hand-latch, $e^5$, pivoted at $f^5$ to the brake-shipper $x^4$, is provided with a finger, $g^5$, to pass behind the shipper-lever $t^4$, as in Fig. 22.

The end of the stop-bar $q^4$, when moved by the dagger $l^4$, acts upon the upper end of the brake-shipper $x^4$, and moves it forward, and it resting against the shipper-lever $t^4$, provided at top with a handle, pushes it out of engagement with its holding-notch in the usual plate $w^4$, attached to the end of the breast-beam. The bar $q^4$ by its motion simultaneously releases both levers.

The lever $x^4$, released in this way, moves the brake-lever $a^5$ on its fulcrum, to force the shoe $b^5$ quickly against the V-shaped periphery of the brake-wheel $c^5$. At the same time the lever $t^4$ operates a horizontally-moving clutching and unclutching lever, $a^6$, connected by a fork, $b^6$, with a collar, $r^2$, provided with wedge-like prongs, to crowd the clutches $l^2$, carried in guides $f^8$ on the pulley $c^6$, loose on the crank-shaft, so as to cause the clutches to engage or be drawn away from the fast pulley $d^6$, when it is desired that the belt-pulley turn the crank-shaft or run loosely thereon, the two pulleys $c^6$ $d^6$ together constituting a pair of friction-pulleys. The pinion $o^2$ engages a pinion on, and transmits motion to, the shaft $v$ in any usual way.

After stopping the loom, if for any reason it becomes necessary to move the lay by hand before commencing to weave regularly, the operator will grasp the handle $e^5$, turn it on its fulcrum $f^5$ to disengage the finger $g^5$ from the lever $t^4$, and will then move the handle and lever $x^4$ toward the loom. This movement will operate the brake-lever so as to release the brake-wheel, that the lathe may be turned by hand. After this, when the loom is to be started by power, the operator will sieze the upper end of the lever $t^4$ and move it so as to engage the expanding friction-pulleys. In case the brake-lever is not first released, the operator may start the loom by moving either the lever $t^4$ or the handle $e^5$, the latter not, however, being turned so as to remove the finger $g^5$ from behind the lever $t^4$, and either of the levers so moved will carry the other with it and start the loom.

When weaving goods wherein one of the shuttles used to form the pattern is to operate for a number of consecutive picks, the pattern-chain may be shortened if the motion of the chain is suspended.

Figure 7:
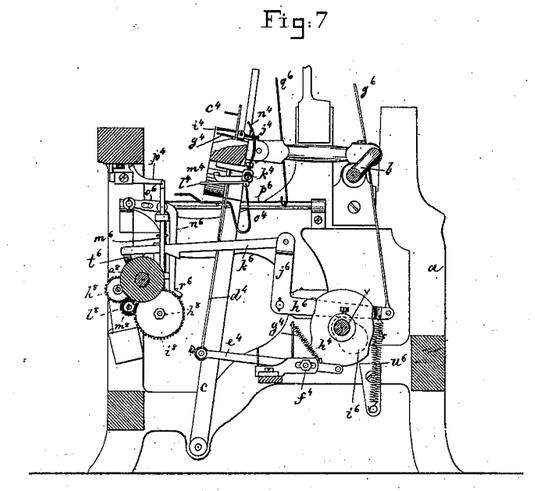
Fig. 7, a section on line $x\ x$, Fig. 1, the lay-race being broken out to show the weft-feeling mechanism.
Figure 8:
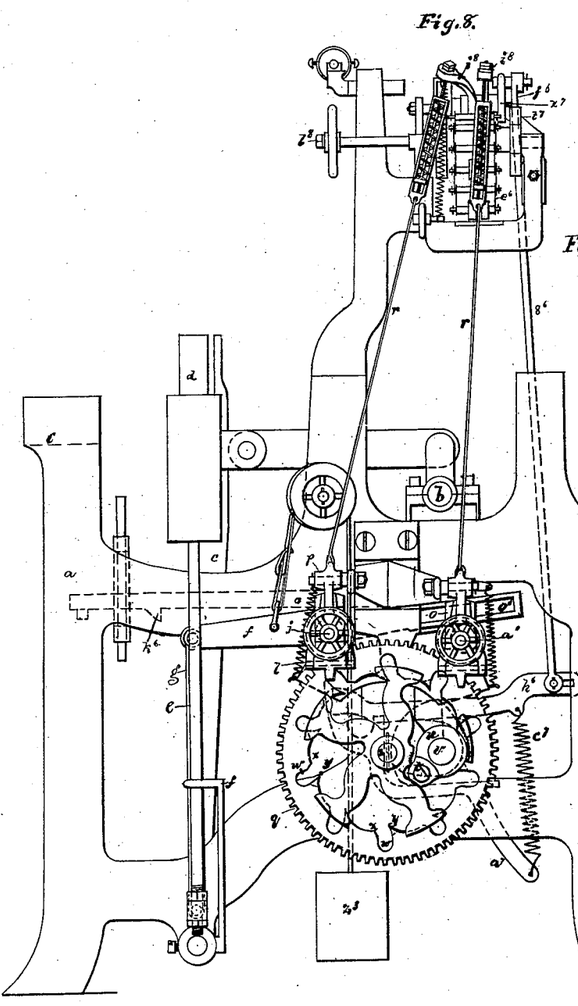
Fig. 8 represents a modification in end elevation, the shuttle-box mechanism being placed at the right-hand end of the loom.

The pattern-surface $e^6$ for the shuttle-boxes is moved by a pawl, $f^6$, its carrier being connected by a rod, $g^6$, with a lever, $h^6$, actuated by a cam, $i^6$, shown in Fig. 7 in dotted lines, at each rotation of shaft $v$. This lever $h^6$ has an arm, $j^6$, to which is pivoted a hooked rod, $k^6$, extended forward through a slot, $l^6$, in a slide-bar, $m^6$. A locking and releasing lever, $n^6$, is pivoted to a lever, $o^6$, (shown in Figs. 24 and 25,) supported on a stationary pin, connected with a fixed part of the loom. This lever $o^6$ is provided with a hole to receive a finger on a rock-shaft, $p^6$, controlled as to its motions by a rod, $q^6$, connected with a finger resting upon the pattern-surface, as usual.

The pattern-surface is provided with elevations and depressions, to lift the releasing-lever $n^6$ whenever it is desired that either shuttle of the series operate a number of picks in succession. When the lever $n^6$ is lifted its hook $r^6$ (see Fig. 27) engages a pin, $s^6$, at the lower end of the sliding bar, and it lifts the outer end of the hooked arm $k^6$ from its rest $t^6$, so that its hook at the next backward movement of the arm engages the bar and prevents the arm $h^6$ from descending under the action of the spring $u^6$, and consequently the cam cannot operate such arm, and the movement of the pattern-cylinder for the box-motion is stopped. This hook $r^6$ holds the bar and hook $k^6$ in position for a certain number of picks, and then releases the bar $m^6$ to permit the pattern-chain to be again operated.

Figure 24:
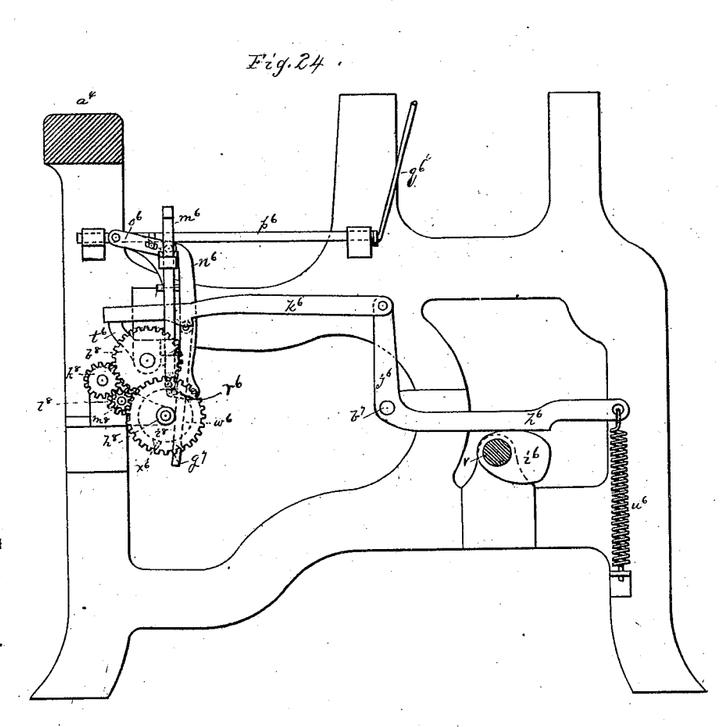
Fig. 24, a section on line $z\ z$ of Fig. 25.
Figure 25:
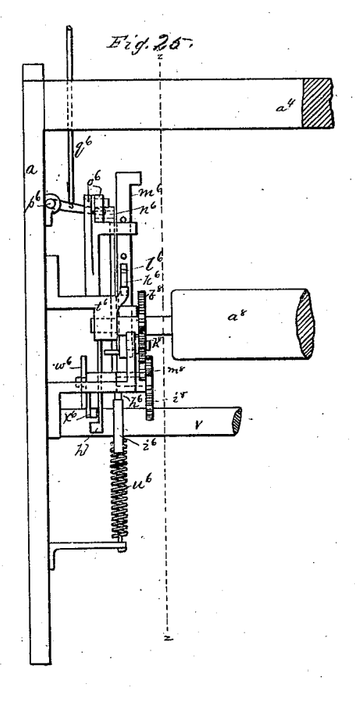
Fig. 25 shows one system of devices for temporarily discontinuing the operation of the pattern-chain upon the shuttle-boxes whenever it is desired that any one shuttle operate for a number of consecutive picks.

In Figs. 25 to 30 the lower end of the releasing-lever $n^6$ is adapted to be operated by pins on an auxiliary pattern-plate, $w^6$, provided with suitable pattern pins or projections $x^6$, that operate to move the arm at the proper time to release the hook $r^6$ from the pin $s^6$ and let the bar $m^6$ fall, thus permitting the hooked rod $k^6$ to move and the lever $h^6$ to be taken up by the cam when at its top throw. This auxiliary pattern is moved in this instance by a train of gearing, deriving motion from a pinion on the take-up roller, as shown in Figs. 24 and 25.

Figure 26:
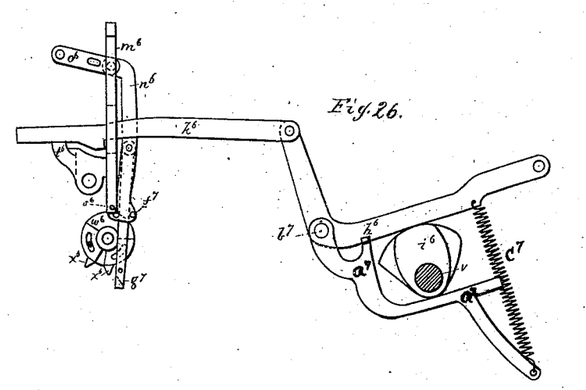
Figs. 26, 27, 28, 29, and 30 are details of mechanism to stop the action of the pattern-chain upon the boxes.

In Fig. 26 the bar $m^6$ is depressed and the hook $k^6$, reciprocated through the slot $l^6$, lies upon the rest $t^6$; but the hook is not caught, and the pattern-chain for the shuttle-boxes will move one step at each rotation of the shaft. An auxiliary arm, $a^7$, may be pivoted to the lever $h^6$ at $b^7$, and, connected with such lever by a spring, $c^7$, may be moved by a cam, $d^7$, (see Fig. 32 and dotted lines, Fig. 26,) to throw the arm $a^7$ down positively, thereby increasing the quickness and force of the spring $c^7$. When the lever $h^6$ is held up the spring $c^7$ permits the arm $a^7$ to be moved without moving the lever $h^6$.

Figures 27, 28:
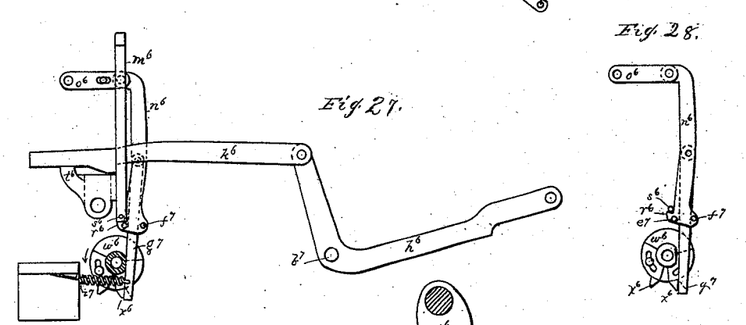
Figure 29:
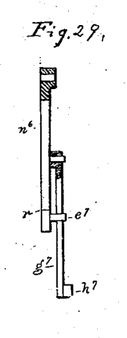
Figure 30:
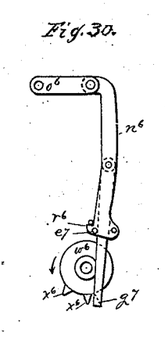

In Fig. 27, the slide-bar is held up by the hook of the releasing-lever, and the pattern-chain for the shuttle-boxes is then stopped. Fig. 28 shows the releasing-lever $n^6$ and its hook, as holding the pin $s^6$, and the projection $x^6$ of the auxiliary pattern as just commencing to move the lever $g^7$, pivoted on the lever $n^6$, to release the hook from the pin of the slide-bar. In Fig. 30, the lever $g^7$ is shown as engaging the inside pin $e^7$ of the releasing-lever, and in Fig. 28 it is shown as engaging the outside pin $f^7$.

When weaving a pattern wherein one shuttle operates for a considerable time, and then another operates but two or three times, it is necessary that the end of the lever come quickly past the end of the pin $x^6$ to engage a second pin $x^6$. This could not be done quickly enough if the lever $g^7$ and releasing-lever $n^6$ were in one piece. By pivoting the lever $g^7$ to the lever $n^6$, the pin $x^6$ will move it against the outside pin $f^7$ of the lever $n^6$, as in Fig. 28, just before the hook is released; and when the hook is released the lever $g^7$ will move quickly under the action of the spring $i^7$, Fig. 27, until stopped by the inside pin $e^7$, and such motion will move the end $h^7$ (see Fig. 29) of the lever $g^7$, against which the pin $x^6$ works, quickly past the pin.

To better adapt this loom to the weaving of handkerchiefs, the following mechanism is provided: The pinion $b^8$ on the shaft of the roll $a^8$, by which the cloth-receiving roller is moved by frictional contact therewith, is connected, through suitable toothed wheels $k^8$ $l^8$ $m^8$, (see Figs. 1, 7, 24, and 25,) with pinion $i^8$ on the shaft $h^8$, carrying the auxiliary pattern-plate $w^6$, provided with the adjustable pins or projections $x^6$, which control the length of the handkerchief, in order that such pattern-plate may be automatically turned backward and in unison with the take-up roll, when, from any imperfections in the weaving, it becomes necessary to turn the roll backward. This connection insures the production in a loom of handkerchiefs of equal length.

Figs. 31 and 32 represent a modification of devices to stop the motion of the chain for the boxes.

In such figures the usual pattern-chain will rest on the barrel $s^7$, having a ratchet, $t^7$, to be engaged and moved by the usual pawl $f^6$. On the shaft $u^7$, carrying the pattern-surface, is placed a ratchet, $v^7$, and an attached toothed gear, $w^7$. The pawl-carrier $x^7$ has an auxiliary pawl pivoted at the side of pawl $f^6$, but made a little longer than it, (see dotted lines, Fig. 36,) and this auxiliary pawl rotates the ratchet $v^7$ and its attached toothed pinion $w^7$ one step at each movement of the shaft $v$ of the loom, the rod $g^6$ being connected with an arm, like $h^6$. This pinion $w^7$, through the train of gearing $a^8$ $b^8$ $c^8$, moves an auxiliary pattern-surface, and operates a lever, $g^7$, and hooked releasing-lever $n^6$ at suitable times to release a bar, $d^8$, adapted to be lifted by the hook when it is raised by a pin on the pattern-surface, the releasing-lever and its hook being operated substantially as hereinbefore described. This bar $d^8$ has a finger, $e^8$, that, when the bar is lifted by the releasing-lever $r^6$, causes a pin on the finger $e^8$ to throw the pawl $f^6$ out of engagement with its ratchet $t^7$, and stop the motion of the pattern-surface. The upper end of this bar $d^8$ is notched, to be engaged by a sliding holding-bar, $f^8$, held pressed against the bar $d^8$ by a spring, $g^8$, and released at each movement of the pawl by the upper end $h^8$ of the pawl-carrier; but the arm will not drop until released by the movement of the releasing-lever $n^6$, operated upon by a suitable pin of the auxiliary pattern-surface.

Figures 2, 3:
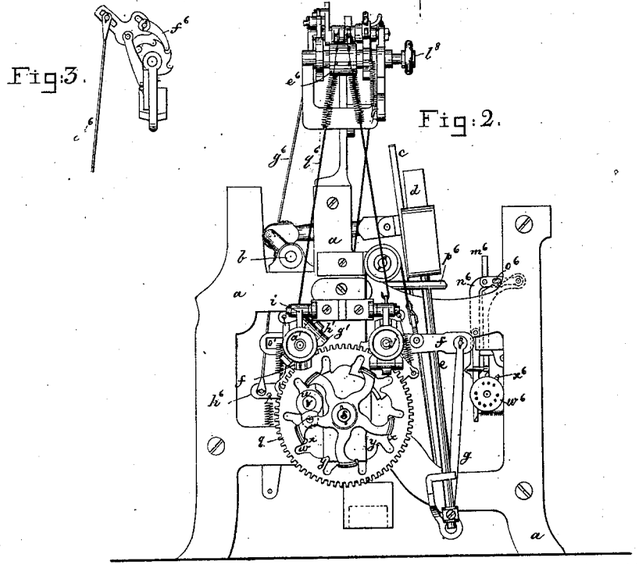
Fig. 2, a view of that end of the loom containing the shuttle-box-moving mechanism.
Fig. 3, a detail of the pawl to move the pattern mechanism.
Figure 4:
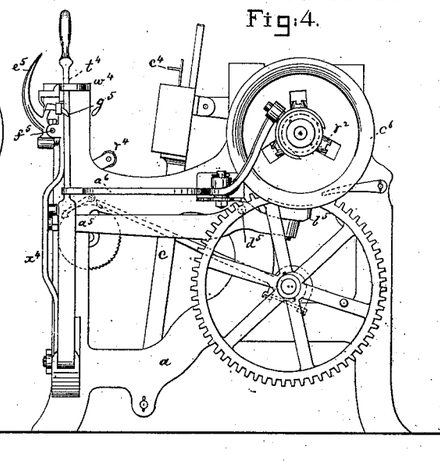
Fig. 4, a view of that end of the loom containing the driving and stopping mechanism.
Figure 5:
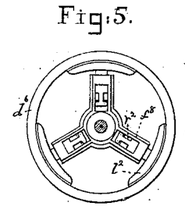
Figs. 5 and 6, details of such mechanism.
Figure 6:
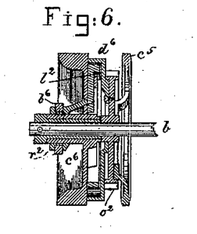

The pattern-cylinder may be rotated by hand through the hand-wheel $l^8$, Fig. 2.

The loose member $c^6$ of the friction-pulley is made quite heavy, as in English Patent No. 1,269 for the year 1867, and as in other looms commonly used in this country, in order that such loose pulley may have sufficient momentum to quickly pick up the fast member $d^6$ of the clutch-pulley when the two members are engaged.

In connection with clutch-pulleys to start the shaft, I employ a brake-pulley and brake, to stop the crank-shaft instantly.

I claim—

1. The arm $i$ and its attached eccentric, in combination with the shuttle-box lever, having its fulcrum on the eccentric, and with a rotating shaft and mechanism to move it intermittingly a semi-rotation and then hold it at rest, substantially as described.

2. An intermittingly-operated shaft, and double arms connected therewith, in combination with knee-levers, controlled by a pattern-surface and a pivoted holder, $s^1$, to hold the arm until the clutch-finger for moving the arm-carrying shaft is in engagement with the clutch-gear, substantially as described.

3. The brake-shipper and V-shaped brake-pulley, in combination with a brake-lever and shoe and an eccentric-fulcrum for the brake-lever, substantially as described.

4. The brake-lever, the brake-shipper, and the handle $e^5$, provided with a finger, $g^5$, in combination with the shipper-lever $t^4$, to operate substantially as described.

5. The brake-shipper and shipper-lever arranged with relation to each other, as described, in combination with a stop-bar to operate both levers simultaneously, whereby one applies the brake and the other unclutches the friction-pulleys, as described.

6. The grid and weft-fork and its hook $j^4$, in combination with a rock-shaft, provided with a dagger, and an arm, $n^4$, provided with a slot, 20, to operate substantially as described.

7. A weft-fork, a spring to hold it in balanced position, a grid connected with a rising and falling rod adapted to move with the lay, in combination with a lever and a cam to operate the grid, substantially as described.

8. The grid, in combination with the weft-fork and a spring to hold it in balanced position and co-operate with the grid, substantially as described.

9. A weft-fork, provided with a backwardly-extended hook, $j^4$, in combination with a spring to hold such fork in balanced position, substantially as set forth.

10. The combination, with the weft-fork and its hooked arm $j^4$, of the rock-shaft, provided with a dagger, its arm $n^4$, and the spring $o^4$, and a roller to operate it, substantially as described.

11. A guide-bar and hooked arm, $k^6$, connected with a lever, the latter adapted, substantially as described, to move through suitable connections, the pattern-chain for the shuttle-boxes, in combination with a lever, $n^6$, and a pattern-surface to lift it to hold the guide-bar in position to be engaged by the hooked lever, to suspend the action of the box-chain for a certain period, substantially as set forth.

12. The guide-bar $h^6$, a hooked lever, $n^6$, a pattern-surface, and intermediate connections, to lift the hooked lever and guide-bar, in combination with an auxiliary pattern-surface to disengage the lever $n^6$ from the guide-bar, substantially as described.

13. The guide-bar, hooked lever $n^6$, and its pins $e^7 f^7$, in combination with the pivoted lever $g^7$, to operate the lever with relation to the pins of the auxiliary pattern, substantially as described.

14. An auxiliary pattern-surface to determine the period of suspension of the action of the box-pattern, a roller to control the take-up of the fabric, and gearing to connect them, combined as described, whereby the pattern-surface and roller move automatically together in unison when the roller is moved either forward or backward, substantially as described.

In testimony whereof I have signed my name to this specification in the presence of two subscribing witnesses.

HORACE WYMAN.

Witnesses:
J. B. SYME,
J. A. WARE.